United States Patent [19]
Mee

[11] Patent Number: 5,307,926
[45] Date of Patent: May 3, 1994

[54] APPARATUS FOR STORING MEDIA

[76] Inventor: Greg Mee, 34933 Heatherview, Yucaipa, Calif. 92399

[21] Appl. No.: 95,922

[22] Filed: Jul. 21, 1993

[51] Int. Cl.$^5$ ............................................. B65D 85/57
[52] U.S. Cl. ................................. 206/311; 206/309; 206/312; 206/425; 312/9.45; 40/377; 40/379
[58] Field of Search ............... 206/307, 309, 310, 311, 206/312, 425, 444; 312/9.45, 186; 40/377, 379

[56] References Cited

U.S. PATENT DOCUMENTS

| | | | |
|---|---|---|---|
| 2,220,189 | 11/1940 | Walters | 40/379 |
| 2,463,450 | 3/1949 | Wisner | 206/311 |
| 3,659,703 | 5/1972 | Oliver | 206/425 |
| 3,890,727 | 6/1975 | Rose | 40/379 |
| 4,035,938 | 7/1977 | Neilsen | 40/379 |
| 4,165,575 | 8/1979 | Neilsen | 40/379 |
| 4,204,351 | 5/1980 | Hawkins | 40/379 |
| 4,453,326 | 6/1984 | Hoffman et al. | 312/186 |
| 4,465,187 | 8/1984 | Kinard et al. | 206/425 |
| 4,599,815 | 7/1986 | Waldo | 40/377 |
| 4,778,047 | 10/1988 | Lay | 206/425 |
| 5,176,250 | 1/1993 | Cheng | 206/309 |
| 5,183,177 | 2/1993 | Yu | 206/309 |
| 5,197,600 | 3/1993 | Garcia | 206/444 |

FOREIGN PATENT DOCUMENTS 8404279  11/1984  PCT Int'l Appl. ................ 206/425

OTHER PUBLICATIONS

"RA 100" Sales Brochure, 2 pages, Radial Access Co., P.O. Box 223, Miamiville, Ohio 45147 May 1993.

Primary Examiner—David T. Fidei

[57] ABSTRACT

An apparatus is provided for storing media, such as compact discs, or the like. A pair of spaced apart, vertically oriented supports each provide an axle support. A rigid horizontal mounting rod is supported by a pair of integral end axles, each of which extend colinearly at each end of the rod for rotational engagement with one of the axle supports. The rod includes a cylindrical surface between the end axles for providing a plurality of parallel, longitudinal flutes therein. A knob is fixed to one or both of the end axles for enabling rotating of the mounting rod. The vertically oriented supports may be sidewalls of a cabinet for enclosing the apparatus. A plurality of flexible bags for storing the media each include a peripheral edge and a pair of mounting holes positioned adjacent to the edge. The bags are of a thickness such that the edge of at least one of the bags fits within one of the flutes. Each flexible bag is made of a transparent or semi-transparent material, such that the media may be viewed through the bag when the media is stored in the bag. A pair of mounting straps engages one of the mounting holes in each of the bags and circles the mounting rod so that the bags are fastened in positions extending radially from the mounting rod.

8 Claims, 2 Drawing Sheets

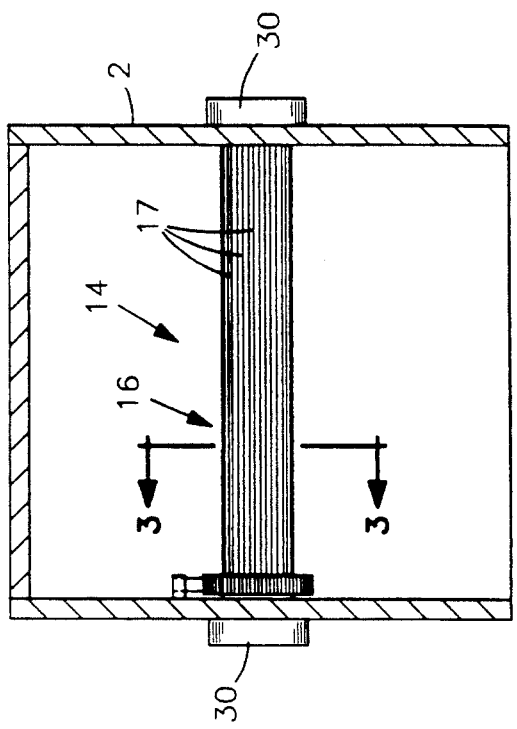
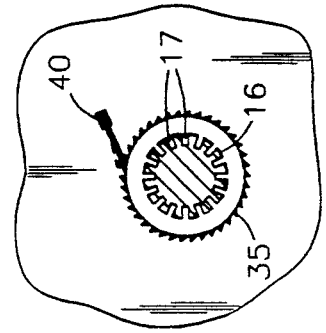
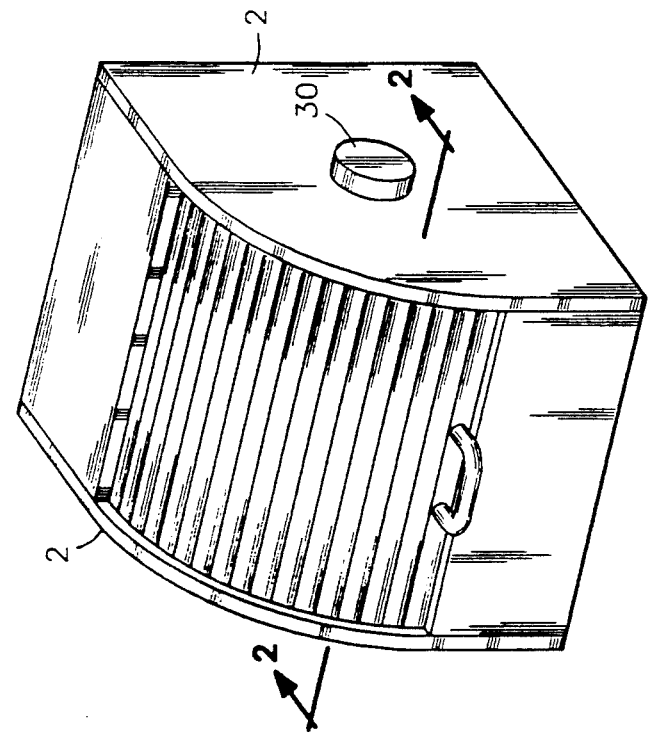

APPARATUS FOR STORING MEDIA

FIELD OF THE INVENTION

This invention relates generally to audio and video media storage, and, more particularly, is directed towards a rotatable storage rack for flat media.

BACKGROUND OF THE INVENTION

Compact discs, video discs, and the like, all require convenient storage while not in use. Conventional storage racks for such media typically only display a thin side panel of the media packaging, requiring a person who is looking for a particular media to read each package in turn. Such thin side panels do not have enough room for display of quickly recognized graphic designs other than textual identifiers. As a result, finding a particular media in such a conventional storage rack is relatively time consuming.

Several prior art devices exist for displaying the larger front surface of the media or media package. The larger front surface of such media packages usually includes a quickly recognized graphic design as well as a textual identifier. As a result, searching for a particular media by looking at such front panels takes relatively little time. One example of such a prior art device is found in U.S. Pat. No. 5,197,600 to Garcia on Mar. 30, 1993. Such a device includes a rotatable spindle that rigidly holds a plurality of media holders. As the spindle is rotated, the front face of each media is displayed in turn. Such a device, while perhaps well-suited for holding rigid computer disks and the like, is not well-suited for holding compact audio and CD ROM discs since the rigid holding means of such a device scratches the data surface of such discs. In such a device, therefore, compacts discs and the like must be stored in their protective packages, which are bulky and reduce the storage capacity of such devices. Further, rigid holding means of devices of this type are relatively expensive to manufacture.

Another prior art device, known as the "RA 100," which is produced by Radial Access of Miamiville, Ohio, provides an open structure with suspended padded flexible pockets. To use such a device, one must manually flip each pocket or sleeve over in turn to see the next one. Such a device is more difficult to use, therefore, than the Garcia device since with the Garcia device the user simply rotates either of the two knobs to rotate the spindle and flip sequentially through the media. Further, the Radial Access device is open to the air and therefore the sleeves of such a device are prone to collecting dust.

Clearly, then, there is a need for a media storage device that enables the user to flip through each media in turn. Such a needed device would display a relatively large surface of the media for enabling quick recognition, and would allow the media to be stored in flexible sleeves for maximizing storage capacity. Further, such a needed device would be easy to use in that the user would be able to flip through all of the media stored in the device relatively quickly. Still further, such a needed device would include a closure for preventing dust from collecting on and within the sleeves of the device, and would be relatively inexpensive to manufacture. The present invention fulfills these needs and provides further related advantages.

SUMMARY OF THE INVENTION

The present invention is an apparatus for storing media, such as compact discs, or the like. Most appropriately, the apparatus is a box or cabinet having an interior axle support on two sidewalls. A rigid horizontal mounting rod is supported by a pair of integral end axles extending from its ends and providing rotational engagement with the axle supports. The rod has a plurality of parallel, longitudinal flutes. A knob is fixed to one or both of the end axles for enabling rotating of the mounting rod. A plurality of flat flexible bags for storing the media each include a slot for inserting a compact disc, and a pair of mounting holes positioned adjacent to one edge of the bag. The bags are of a thickness such that the edge of preferably two of the bags fits within one of the flutes. Preferably each flexible bag is made of a transparent or semi-transparent material, such that a compact disc may be viewed through the bag when the media is stored in the bag. Mounting straps engage the mounting holes in the bags and circle the mounting rod so that the bags are fastened in positions extending radially from the mounting rod.

The present invention enables the user to flip through each compact disc in turn. The present device displays a relatively large surface of the compact disc for enabling quick recognition, and allows the compact disc to be stored in flexible sleeves for maximizing storage capacity. Further, the present invention is easy to use in that the user is able to flip through all of the media stored in the device relatively quickly by the use of a ratchet device and a rotatable knob protruding from the cabinet. Still further, the present device includes a closure for preventing dust from collecting on and within the sleeves, and is relatively inexpensive to manufacture. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective illustration of the invention, illustrating a cabinet of the invention;

FIG. 2 is a cross-sectional view of the invention, taken generally along lines 2—2 of FIG. 1, illustrating a mounting rod of the invention;

FIG. 3 is a cross-sectional view of the invention, taken generally along lines 3—3 of FIG. 2, illustrating a ratchet gear and ratchet pawl of the invention;

DETAILED DESCRIPTION OF THE PREFERRED EMBODIMENT

Figure 5:
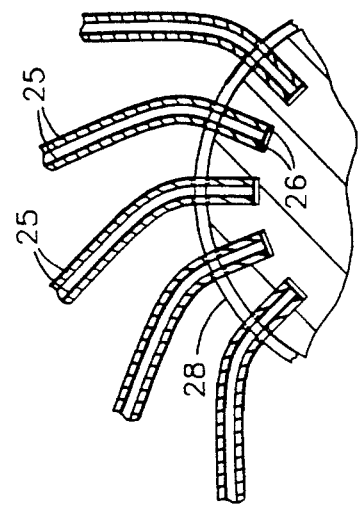
FIG. 5 is a partial front elevational view of the invention, illustrating the flexible bags of the invention and mounting straps therefore.
Figure 6:
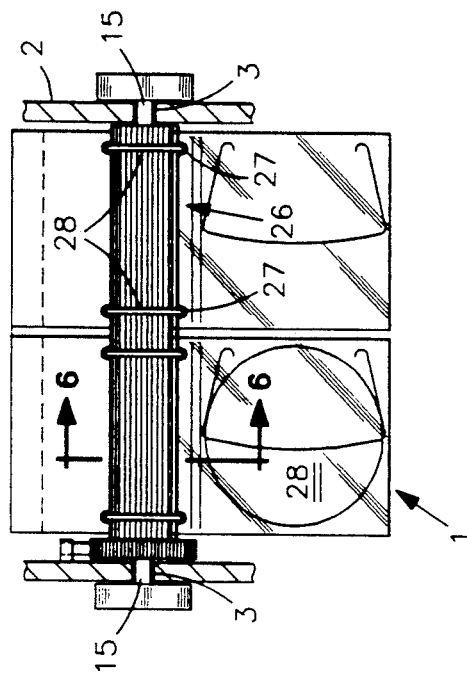
FIG. 6 is a cross-sectional view of the invention, taken generally along lines 6—6 of FIG. 5, illustrating flutes in the mounting rod of the invention for mounting of the plastic bags.

FIGS. 1, 2, and 5 illustrate an apparatus for storing media 1, such as compact discs, or the like. A pair of spaced apart, vertically oriented supports 2 each provide an axle engagement means 3. A rigid horizontal mounting rod 14 is supported by a pair of integral end axles 15. One axle 15 extends colinearly at each end of the rod 14 for rotational engagement with one of the axle engagement means 3 of each support 2. The rod 14 includes a cylindrical surface 16 between the end axles 15 for providing a plurality of the parallel, longitudinal flutes 17 therein. Preferably, a knob 3 is fixed to at least one of the end axles 15 for enabling rotating of the mounting rod 14. Each vertically oriented support 2, in one embodiment of the invention, is a sidewall of a cabinet for enclosing the apparatus. The supports 2 and the cabinet are manufactured from any suitable rigid, aesthetically pleasing material such as plastic or wood. Such a cabinet preferably includes a cabinet closure for preventing dust from collecting inside the cabinet (FIG. 1).

Figure 4:
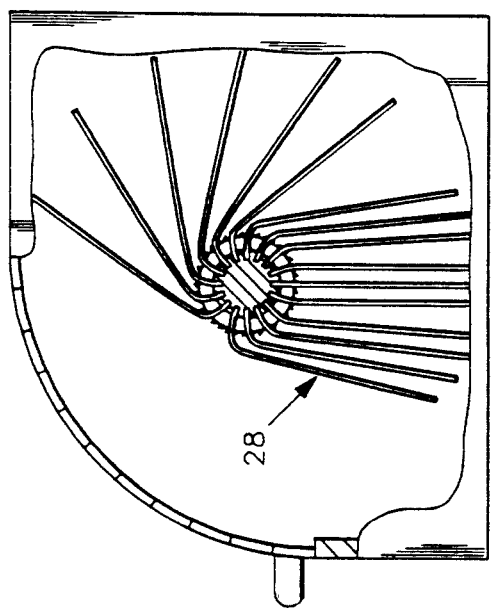
FIG. 4 is a left-side elevational view, partially broken away, illustrating flexible bags of the invention for storing media.

A ratchet gear 35 is preferably attached to the mounting rod 14 at one end of the mounting rod 14, and a ratchet pawl 40 is attached to one of the vertically oriented supports 2 adjacent the ratchet gear 35. As such, the mounting rod 14 is able to freely rotate in one direction, but is prevented from rotating in the alternate direction by the engagement of the pawl 40 in the ratchet gear 35 (FIG. 3). As a result, a large surface 28 of at least one of the media 1 will always be displayed to the user(FIGS. 4 and 5).

A plurality of flexible bags for storing the media each include a peripheral edge 26 and a pair of mounting holes 27 positioned adjacent to the edge 26. The bags 25 are of a thickness such that the edge 26 of at least one of the bags 25 fits within one of the flutes 17. Preferably each flexible bag 25 is made of a transparent or semi-transparent material, such as clear plastic or vinyl, such that the media 1 may be viewed through the bag 25 when the media 1 is stored in the bag 25. A pair of mounting straps 28 for encircling the cylindrical surface 16 in annular coaxial juxtaposition. Each of the straps 28 engages one of the mounting holes 27 in each of the bags 25 are fastened in positions extending radially from the mounting rod 14. As such, the media 1 may be placed in the bags 25 for radially positioned storage in rotational access as the mounting rod 14 is turned on the supports 2. In operation, the knob 30 is rotated in the allowed direction, whereby each bag 25 in turn comes into view. When the desired media 1 in one of the bags comes into view, it may be removed from the bag 25 and used.

While the invention has been described with reference to a preferred embodiment, it is to be clearly understood by those skilled in the art that the invention is not limited thereto. Rather, the scope of the invention is to be interpreted only in conjunction with the appended claims.

I claim:

1. An apparatus for storing media comprising:
   a pair of spaced apart, vertically oriented supports, each of the supports providing axle engagement means;
   a horizontal mounting rod supported by a pair of integral end axles, one of the axles extending colinearly at each end of the rod for rotational engagement with the axle engagement means of one of the vertically oriented supports, the rod including a cylindrical surface between the end axles providing a plurality of parallel, longitudinal flutes therein;
   a plurality of flexible bags for storing media, each of the bags including a peripheral edge and a pair of mounting holes positioned adjacent to the edge, the bags of a thickness such that the edge of at least one of the bags fits within one of the flutes;
   a pair of mounting straps for encircling the cylindrical surface in annular coaxial juxtaposition, each of the straps engaging one of the mounting holes in each of the bags so that the bags are fastened in positions extending radially from the mounting rod;
   whereby the media may be placed into the bags for radially positioned storage in rotational access as the mounting rod is turned on the supports.

2. The apparatus for storing media of claim 1 further including a knob fixed to at least one of the end axles for rotating the mounting rod.

3. The apparatus for storing media of claim 1 further including a ratchet gear attached to the mounting rod at one end thereof, and a ratchet pawl for engaging the ratchet gear, such that the ratchet mounting rod is able to freely rotate in one direction, but is prevented from rotating in the alternate direction by the engagement of the pawl in the ratchet gear thereby enabling the improved turning of the apparatus for review of the media in sequence.

4. The apparatus for storing media of claim 1 wherein the vertically oriented supports are sidewalls of a cabinet for enclosing the apparatus.

5. An apparatus for storing media comprising:
   a pair of spaced apart, vertically oriented supports, each of the supports providing axle engagement means;
   a horizontal mounting rod supported by a pair of integral end axles, one of the axles extending colinearly at each end of the rod for rotational engagement with the axle engagement means of one of the vertically oriented supports, the rod including a cylindrical surface between the end axles providing a plurality of parallel, longitudinal flutes therein;
   a plurality of flexible bags for storing media, each of the bags including a peripheral edge and a pair of mounting holes positioned adjacent to the edge, the bags of a thickness such that the edge of at least one of the bags fits within one of the flutes;
   two pair of mounting straps for encircling the cylindrical surface in annular coaxial juxtaposition, each of the straps engaging one of the mounting holes in each of the bags so that the bags are fastened in positions extending radially from the mounting rod two sets of the bags being positioned side by side on the mounting rod.
   whereby the media may be placed into the bags for radially positioned storage in rotational access as the mounting rod is turned on the supports.

6. The apparatus for storing media of claim 5 further including a knob fixed to at least one of the end axles for rotating the mounting rod.

7. The apparatus for storing media of claim 5 further including a ratchet gear attached to the mounting rod at one end thereof, and a ratchet pawl for engaging the ratchet gear, such that the ratchet mounting rod is able to freely rotate in one direction, but is prevented from rotating in the alternate direction by the engagement of the pawl in the ratchet gear thereby enabling the improved turning of the apparatus for review of the media in sequence.

8. The apparatus for storing media of claim 5 wherein the vertically oriented supports are sidewalls of a cabinet for enclosing the apparatus.

* * * * *